US011277435B2

(12) United States Patent
Itikarlapalli et al.

(10) Patent No.: US 11,277,435 B2
(45) Date of Patent: Mar. 15, 2022

(54) REDUCING NETWORK ATTACK SURFACE AREA FOR A DATABASE USING DEEP INPUT VALIDATION

(71) Applicant: Oracle International Corporation, Redwood Shores, CA (US)

(72) Inventors: Krishna Mohan Itikarlapalli, Bengaluru (IN); Santanu Datta, Fremont, CA (US); Srinath Krishnaswamy, Fremont, CA (US); Lakshminarayanan Chidambaran, Chennai (IN); Rajesh Kumar, Noida (IN); Sumit Sahu, Bangalore (IN); Rajendra Pingte, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 333 days.

(21) Appl. No.: 15/705,113

(22) Filed: Sep. 14, 2017

(65) Prior Publication Data

US 2018/0077196 A1 Mar. 15, 2018

Related U.S. Application Data

(60) Provisional application No. 62/394,555, filed on Sep. 14, 2016.

(51) Int. Cl.
*H04L 29/00* (2006.01)
*H04L 29/06* (2006.01)
(Continued)

(52) U.S. Cl.
CPC ...... *H04L 63/1441* (2013.01); *H04L 63/0245* (2013.01); *H04L 63/102* (2013.01); *G06F 9/547* (2013.01); *G06F 16/00* (2019.01)

(58) Field of Classification Search
CPC ............ H04L 63/1441; H04L 63/0245; H04L 63/102; G06F 16/00
(Continued)

(56) References Cited

U.S. PATENT DOCUMENTS 5,828,833 A 10/1998 Belville et al.
6,169,992 B1 1/2001 Beall et al.
(Continued)

FOREIGN PATENT DOCUMENTS

WO WO2006103656 A2 10/2006

*Primary Examiner* — Brandon S Hoffman
*Assistant Examiner* — Michael D Anderson
(74) *Attorney, Agent, or Firm* — Hickman Becker Bingham Ledesma LLP

(57) ABSTRACT

Techniques described herein improve database security by reducing network attack surface area in conjunction with deep input validation. In an embodiment, a database session receives one or more network packets sent via a network, the database session including a database session state that specifies one or more database privileges. The database session reads said one or more network packets into one or more request-packet-buffers, wherein said one or more request-packet-buffers include an RPC op code for a database operation. Based on the one or more database privileges associated with the user associated with the database session, the database session determines whether the RPC op code may be executed. In response to determining that the RPC op code may be executed by said database session, the RPC op code is executed. In response to determining that the op code may not be executed by said database session, the execution of the RPC op code is prevented.

24 Claims, 5 Drawing Sheets

(51) Int. Cl.
  *G06F 9/54*      (2006.01)
  *G06F 16/00*     (2019.01)
(58) Field of Classification Search
  USPC .......................................................... 726/22
  See application file for complete search history.

(56) References Cited

U.S. PATENT DOCUMENTS

| | | | |
|---|---|---|---|
| 6,321,274 B1 * | 11/2001 | Shakib | G06F 9/547 |
| | | | 719/328 |
| 6,523,027 B1 | 2/2003 | Underwood | |
| 7,810,148 B2 | 10/2010 | Ben-Shachar et al. | |
| 8,037,519 B2 | 10/2011 | Kalofonos et al. | |
| 8,894,617 B2 | 11/2014 | Fausak | |
| 8,903,943 B2 | 12/2014 | Glaser et al. | |
| 9,122,644 B2 | 9/2015 | Kruglikov et al. | |
| 9,239,763 B2 * | 1/2016 | Lee | G06F 11/1471 |
| 9,264,400 B1 | 2/2016 | Lin et al. | |
| 9,298,564 B2 | 3/2016 | Lee et al. | |
| 2002/0157020 A1 | 10/2002 | Royer | |
| 2002/0157023 A1 | 10/2002 | Callahan et al. | |
| 2006/0133377 A1 * | 6/2006 | Jain | H04L 63/1408 |
| | | | 370/392 |
| 2007/0276950 A1 | 11/2007 | Dadhia | |
| 2011/0219035 A1 | 9/2011 | Korsunsky et al. | |
| 2013/0179991 A1 | 7/2013 | White et al. | |
| 2014/0095530 A1 | 4/2014 | Lee et al. | |
| 2014/0201838 A1 * | 7/2014 | Varsanyi | G06F 21/552 |
| | | | 726/23 |
| 2016/0269360 A1 | 9/2016 | Gluck | |
| 2017/0116334 A1 | 4/2017 | Kruglikov et al. | |

\* cited by examiner

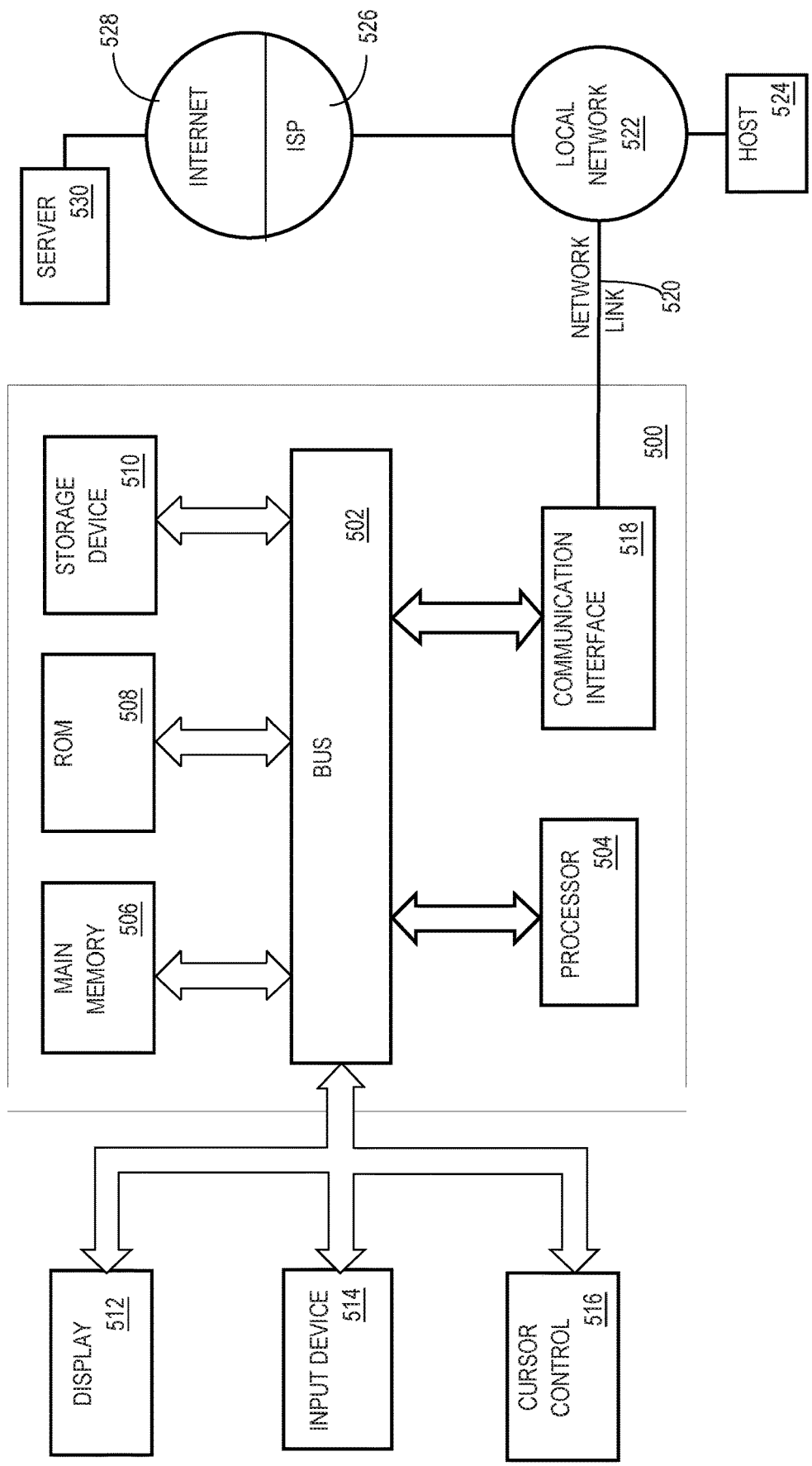

REDUCING NETWORK ATTACK SURFACE AREA FOR A DATABASE USING DEEP INPUT VALIDATION

BENEFIT CLAIM

This application claims priority to U.S. Provisional Application No. 62/394,555, filed on Sep. 14, 2016, the entire contents of which is hereby incorporated by reference as if fully set forth herein, under 35 U.S.C. § 119(e).

FIELD OF THE INVENTION

The present invention generally relates to database system security, and in particular, reducing network attack surface area in conjunction with deep input validation.

BACKGROUND

Database servers traditionally expose a lot of functionality available to clients from across the network. Such functionality is exercised by the clients by invoking remote procedure calls ("RPCs") corresponding to each functionality using a network protocol implemented by the data vendor. For example, a database may expose remote procedure calls for Logon/Logoff, SQL, Cursor Management, Distributed Transactions, Large Binary/Character objects, Metadata, Queuing, Loading, Distributed databases, Object types, Replication, Backup, Administration calls, Session management, File transfer, Notifications and many others. Database servers typically need to support clients from multiple versions and each specific client version may issue a different flavor for any given remote procedure call.

However, installations of the database such as cloud deployments, backup databases etc., or a customer database may typically only use a small subset of all the functionality allowed by the database in conjunction with clients from a certain version or a subset of versions. In such a scenario, allowing the database to accept remote procedure calls corresponding to all the supported functionality implemented by the database for all supported versions of remote procedure calls needlessly increased the 'network attack surface area' without any functional benefit. Described here are techniques for minimizing the network attack surface area. Also described here are techniques for deep input validation for input parameters.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 5 is a block diagram that illustrates a computer system upon which an embodiment of the invention may be implemented.

DETAILED DESCRIPTION

Figure 1:
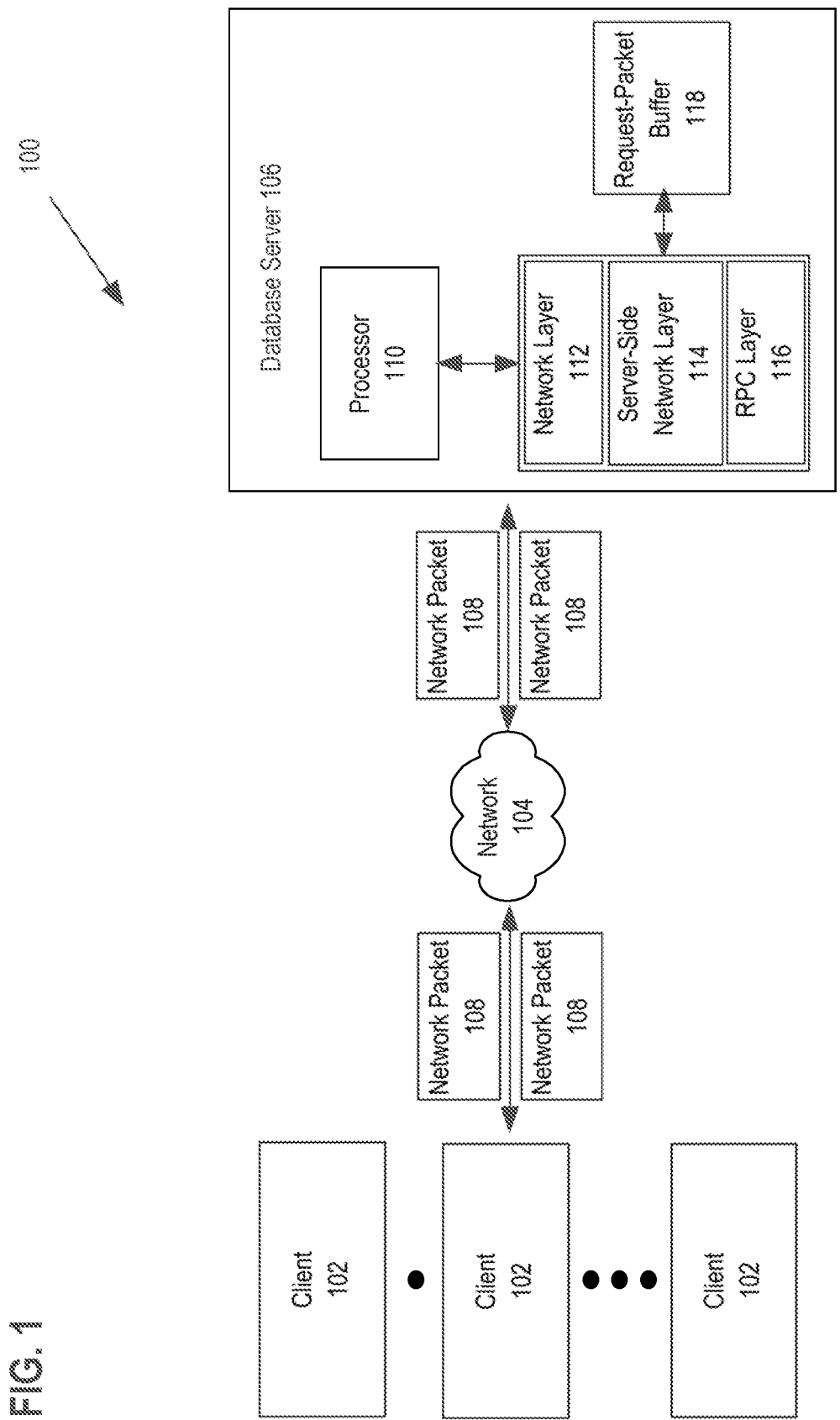
FIG. 1 illustrates an example computer environment with which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Malicious clients may often probe all available remote procedure calls in an attempt to break into the system by exploiting weaknesses in the server implementation. In the context of large scale multi-tenant databases which houses data from multiple tenants, a malicious tenant may try to gain unauthorized access to data belonging to another tenant by attacking any exposed RPC interfaces. Hence, it is prudent from a security perspective to have built in support that allows installations to configure and limit the number of RPC interfaces exposed over the network.

In addition, malicious clients attempting to exploit available RPC interfaces may send invalid/garbage RPC messages. With deep input validation of the incoming RPC messages, the database can reject such malformed messages upfront and once a client sends a certain number of configurable invalid messages, a security action can be taken to penalize the client which may involve auditing the origin of the invalid message, slowing down the client, terminating its connection or even suspending the account.

Techniques are provided for reducing network attack surface area in conjunction with deep input validation for securing a database. In an embodiment, a database session receives one or more network packets sent via a network, the database session including a database session state that specifies one or more database privileges. The database may also be configured to allow only a limited set of opcodes for non-administrative users (indicated by an opcode category that the database is configured with). The database session reads the one or more network packets into one or more request-packet-buffers, wherein said one or more request-packet-buffers include an RPC op code for a database operation. Based on the one or more database privileges, and the opcode-category or categories that are configured, the database session determines whether the RPC identified by the said RPC op code may be executed by the database session. In response to determining that the RPC identified by the RPC op code may be executed by the database session, the RPC identified by the RPC op code is executed. In response to determining that op code may not be executed by said database session, the execution of the RPC identified by the RPC op code is prevented. As used herein, the term: "execute the RPC opcode" may be interpreted as meaning to "execute the RPC identified by the RPC opcode".

In an embodiment, the RPC opcode associated with one or more request packet-buffers has associated metadata (maintained by the RPC layer) specifying data-types and constraints for each RPC parameter. The metadata may also specify the number of such parameters to expect in a certain version of the RPC. The database session may then also determine whether any data type instances included in the one or more request-packet-buffers are valid by ensuring that they adhere to the formats for their respective types specified by the RPC metadata associated with the RPC opcode. In response to determining that all input data included in the request-packet-buffer is valid, the RPC opcode is executed. In response to determining that any data included in the request-packet-buffer is invalid, the execution of the RPC opcode is prevented, and a security action is executed. In another embodiment, in response to receiving a threshold number of invalid RPCs from a particular client through the database session, a security action is executed.

Multi-Tenant Database

In general, a multi-tenant database contains multiple databases that are hosted and managed by a database server. A multi-tenant database generally refers to an architecture in which a single instance of software runs on a database server and serves multiple tenants of that database server. A tenant is a group of users who share a common access with specific privileges to the software instance.

Database Sessions

A session, such as a database session, is a particular connection established for a client to a server, such as a database instance, through which the client issues a series of requests (e.g., requests for execution of database statements such as remote procedure calls). The database server may maintain session state data about the session. The session state data reflects the current state of the database session and may contain the identity of the client for which the session is established, services used by the client, instances of object types, language and character set data, statistics about resource usage for the session, temporary variable values generated by processes executing software within the database session, privileges associated with the client, and storage for cursors and variables and other information. The current state of the database session is all of the session state data associated with a port associated with the database session. Subsequent commands received over the port are assumed by the server to be associated with all of the session state data associated with the port until such session is terminated. When the session is terminated, the session state data is deleted.

When a new session is established on the port, the client determines new session state data to use for the new session and directs the database server to load the new session state data for the new session.

Connections are mechanisms for enabling sessions. A connection may refer to either a physical mechanism, such as a physical port, or a logical connection mechanism, or both. Often, there is a one-to-one mapping of logical connections to physical connections; however, it is possible to have more than one logical connection associated with a single physical connection or more than one physical connection associated with a single logical connection.

The session, process, and port are associated with each other. The process looks to the data in the session data storage corresponding to the process to execute the commands it receives. When the user logs out, the process is terminated, and other users may log into the server using the same port as was previously used, establish a connection, process, and session on the server, and send commands to the server for execution. The server software may limit access to information based on the user identifier stored in the session data storage corresponding to the process accepting the command. For example, a user of database server software may have no access to one set of data, read-only access to a second set of data, and read and write access to a third set of data.

Database Software Layers

Software executed by a database server is organized into groups of software modules (e.g. functions, procedures) referred to herein as software layers. Each software layer comprises software that is configured and/or programmed to perform a specific kind of functionality. A particular software layer may be executed by a process by invoking an interface of a module of the particular software while executing within another software layer. A process executing an application may execute within the operating system layer by invoking API (application program interface) functions to, for example, call a function to open a file, read the file, to open a TCP socket to communicate over a network and transmit data or a network.

The software layers are designed with interfaces that each accept and return particular data types. Some data types, such as strings, large binary objects, or pages are designed by software developers to conform to a format or schema. Developers of modules of software layers, or software that invokes a software layer, program software based on the assumption that data passed to and from the interfaces conform to these format or schemas.

For convenience, software layers or modules are described herein as performing actions or causing those actions when in fact a process executing the software layer performs the action or causes the action.

Overview of Example Embodiment

An example of a computer network implementing the above concepts is a "client-server" system 100 shown in FIG. 1. The system 100 comprises a collection of client nodes 102, e.g., work stations or personal computers, that communicate over a network 104 with a database server 106. The database server is typically a computer having hardware and software elements that provide a sophisticated set of services, or operations, for use by the client nodes 102 to increase the efficiency of their own operations. Several types of networks, including local area networks (LANs), and wide area networks (WANs), may be employed in the client-server system 100.

Nodes coupled to the network typically communicate with the database server by exchanging discrete network packets 108 of data according to pre-defined "protocols". In this context, a protocol consists of a set of rules defining how the nodes interact with the database server. For example, communication in the client-server system 100 typically takes the form of packet exchanges, wherein the clients 102 sends requests or makes calls, such as remote procedure calls, to the database server 106, which perform their services and communicate results back to the clients.

Once a database session is established, various software services or "layers" together act as a data courier for the client application and the database server, establishing and maintaining a connection and exchanging messages.

These layers interact to format data for transfer between a client and server that are communicating over the network. Specifically, predetermined services are performed on the data as it passes through each layer and the layers communicate with each other by means of the predefined protocols.

For example, upon receiving a network packet via the network 104, various software layers internal to the database server 106 begin handling the packet. Software layers such as the network layer 112, the server-side-network layer 114, and RPC layer 116 begin interpreting the data specified in each packet according to the pre-defined protocols defined for each software layer.

For example, the different software layers may include a network layer 112, a server-side-network-layer 114, and a RPC layer 116. The network layer 112 may be a software layer of an operating system configured to read and/or receive data from a client connection associated with a database session. The server-side-network layer 114 may be a software layer used by various other software layers of a database server to communicate data over a network 104. RPC layer 116 may be a software layer of a database server executed by a database session that is programmed to handle remote procedure calls transmitted via the network layer 112 and server-side-network layer 114 through a database session. RPC layer 116 may include metadata for all existing RPCs that specifies expected data-type information for each parameter and may also specify the number of such parameters to expect in a certain version of a RPC.

The network layer 112 may receive network packets 108 from a client 102 via network 104. The RPC layer may read the data received at the network layer 112 into the request-packet-buffer.

The request-packet-buffer 118, into which data is read as described above, includes data in a particular format or schema which the server-side-network layer 114 and the RPC Layer 116 are programmed to handle. For example, the request-packet-buffer 118 may specify a RPC.

When the database server 106 receives data in the request-packet-buffer specifying a RPC, it may invoke the RPC layer 116 to handle the RPC. According to an embodiment, handling the RPC includes determining whether the RPC is allowed by the privileges associated with the database session and/or the allowed opcode-category or opcode-categories configured for the database of database server 106.

Reducing Attack Surface Area in Conjunction with Deep Input Validation

Figure 2:
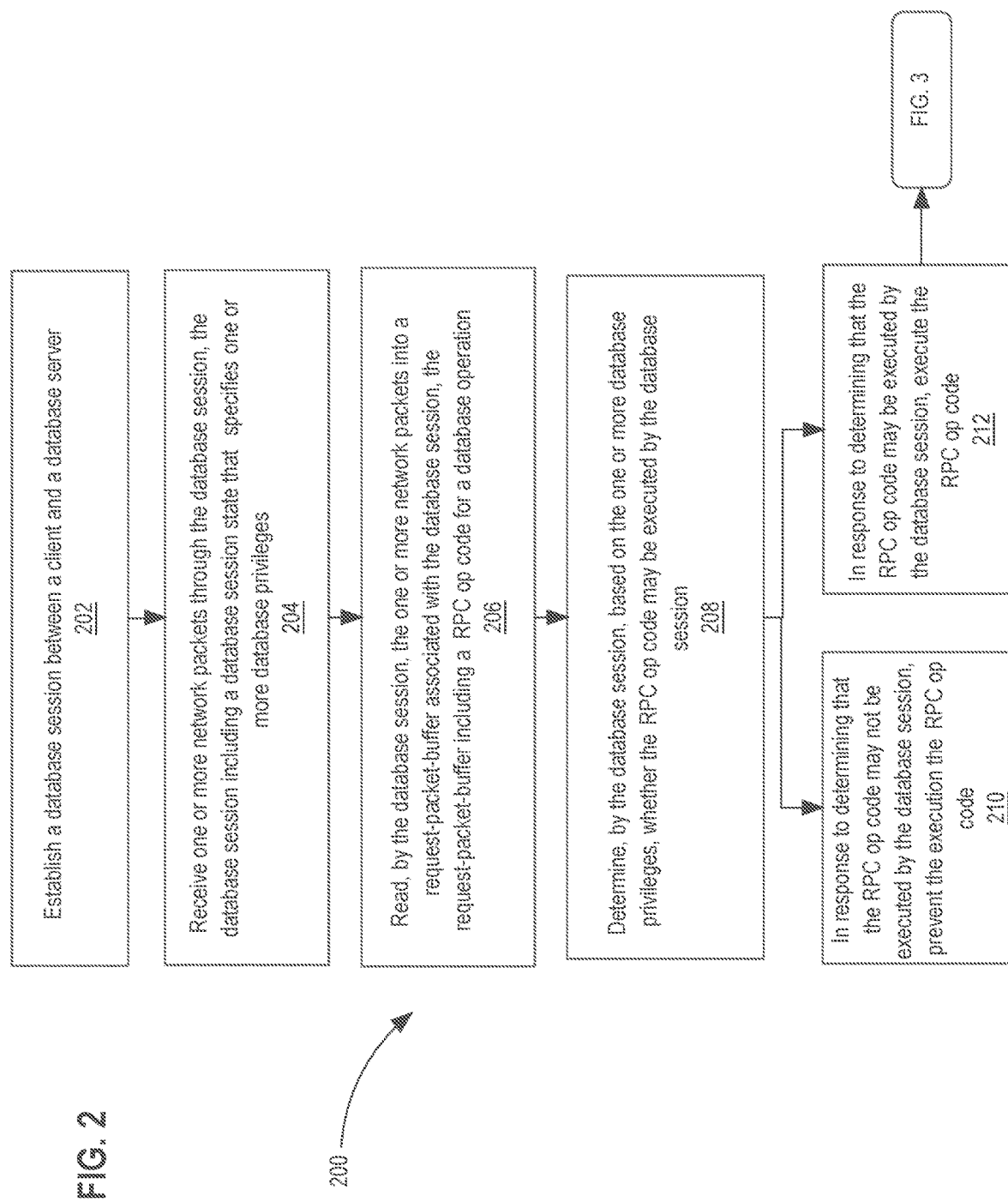
FIG. 2 illustrates a procedure for reducing surface attack area, according to various embodiments.

FIG. 2 illustrates a procedure for reducing attack surface area. For the purposes of illustration, the procedure flow depicted in FIG. 2 is discussed using computer system 100.

At step 202, a database session is established between a client and a database server. For example, client node 102 connects to database server 106 via network 104 and establishes a database session.

At step 204, one or more network packets are received through a database session, the database session including a database session state that specifies one or more database privileges. For example, client node 102 may send one or more network packets 108 via the network 104 through the database session associated with database server 106.

In an embodiment, one or more network packets may be received through the database session at the network layer 112.

In an embodiment, a database session state may include database privileges associated with different clients that control how each client may interact with the database server. For example, the database session state may specify that the execution of certain remote procedure calls from a particular client is allowed based on the privileges associated with the particular client that are specified by the database session state.

In an embodiment, the packets received through the network layer 112 may be TCP/IP packets or any other suitable data packet.

At step 206, the database session reads the one or more network packets into the request-packet-buffer associated with the database session, the request-packet-buffer including an RPC op code for a database operation. For example, the RPC layer 116 may read the data from the network packets 108 received at the network layer 112 into the request-packet-buffer 118.

In an embodiment, one or more network packets that are read into the request-packet-buffer constitute a RPC packet. A RPC packet may have a well-defined structure that includes a RPC opcode, which may be a unique integer or a string identifying a specific RPC, and also input parameters. The data that specifies structure and semantics that a RPC packet adheres to in terms of its parameters is referred to as RPC metadata. RPC metadata may state the types of the input parameters (e.g. whether a parameter is a basic type such as an integer, string, timestamp, or whether the parameter is a singleton type or an array). The RPC metadata may also specify the number of such parameters to expect in a certain version of the RPC packet. The request-packet-buffer may contain a serialized representation of such a RPC packet.

In an embodiment, a RPC op code may comprise a remote procedure call for logging on to the database, logging off from the database, executing SQL statements such as INSERT, UPDATE, DELETE, UPSERT, SELECT, CREATE, ALTER, executing statements belonging to a procedural language such as PLSQL, starting a transaction, committing a transaction, rolling back a transaction, performing a distributed transaction, fetching from cursors, closing cursors, canceling cursors, scrollable cursors, setting application context state, setting session state variables such as CLIENT_IDENTIFIER, MODULE, ACTION, or operations on object types and object instances, backup, recovery, export, import, and/or loading.

At step 208, the database session determines, based on the one or more database privileges, whether the RPC op code may be executed by the database session. For example, the database session via the database server 106 may check the database privileges associated with the particular database session state and determine which remote procedure calls may be executed by the database session.

In an embodiment, the RPC layer 116 may read the data received by the network-layer 112 into the request-packet-buffer 118 and then begin unmarshaling the data included in the request-packet-buffer 118. The RPC layer 116 may then compare the RPC op code specified in the request-packet-buffer 118 to one or more allowed RPC op codes that are specified by the database session. The allowed RPC op codes specified by the database session may be determined by the one or more database privileges associated with the user as specified by database session state.

In an embodiment, the comparison of the RPC op codes included in the request-packet-buffer 118 to the allowed RPCs specified by the database server 106 is executed on the fly by the database session as the data is unmarshaled from the request-packet-buffer.

In another embodiment, the RPC metadata identifies a specific category or categories that an RPC is associated with. The category of an RPC is an identifier that classifies an RPC according to the task that the RPC is used for. The database server may be configured with an initialization parameter that states that it should only expose RPC interfaces for a specific category. For example, the database server can be configured to only allow RPCs that belong to the "DRIVERS" category, which refers to commonly issued RPCs by popular drivers such as OCI, JDBC, ODP.Net, ODBC etc. In such a scenario, non-administrative users will only be allowed to invoke RPCs that fall into the "DRIV- ERS" category. Any other RPCs not belonging to "DRIVERS" category will be rejected unless the connected user is an administrator.

Similarly, the database server could be configured with an initialization parameter that states that it should only expose RPC interfaces used for "BACKUP". In such a scenario, non-administrative users will only be allowed to invoke RPCs that fall into the "BACKUP" category. Any other RPCs not belonging to the "BACKUP" category will be rejected unless the connected user is an administrator.

At step 210, in response to determining that the RPC op code may not be executed by the database session, the database session prevents the execution the RPC op code. For example, if the database session determines that the particular client does not have the required privileges in order for the database session to execute the particular RPC op code, the database session will prevent the execution of the RPC op code.

At step 212, in response to determining that said RPC op code may be executed by the database session, the RPC op code is executed. For example, if the database session determines that the particular client does have the required privileges in order for the database session to execute the particular RPC op code, the database session will execute the RPC op code.

It should be noted that in other approaches, the SQL compilation/execution layer performs checks on privileges for the database session before performing requested SQL operations. The operations described in FIG. 2 are performed by the RPC layer much earlier in the request processing lifecycle, much before compiling or executing any specific SQL statement included in the RPC.

Deep Input Validation

In an embodiment, in response to determining that the RPC op code may be executed by said database session, the request-packet-buffer 118 may be inspected to determine whether the data contained in the request-packet-buffer 118 is valid before the database session executes the RPC op code. An example of data packet inspection and validation is illustrated in detail by flow 300 of FIG. 3.

Figure 3:
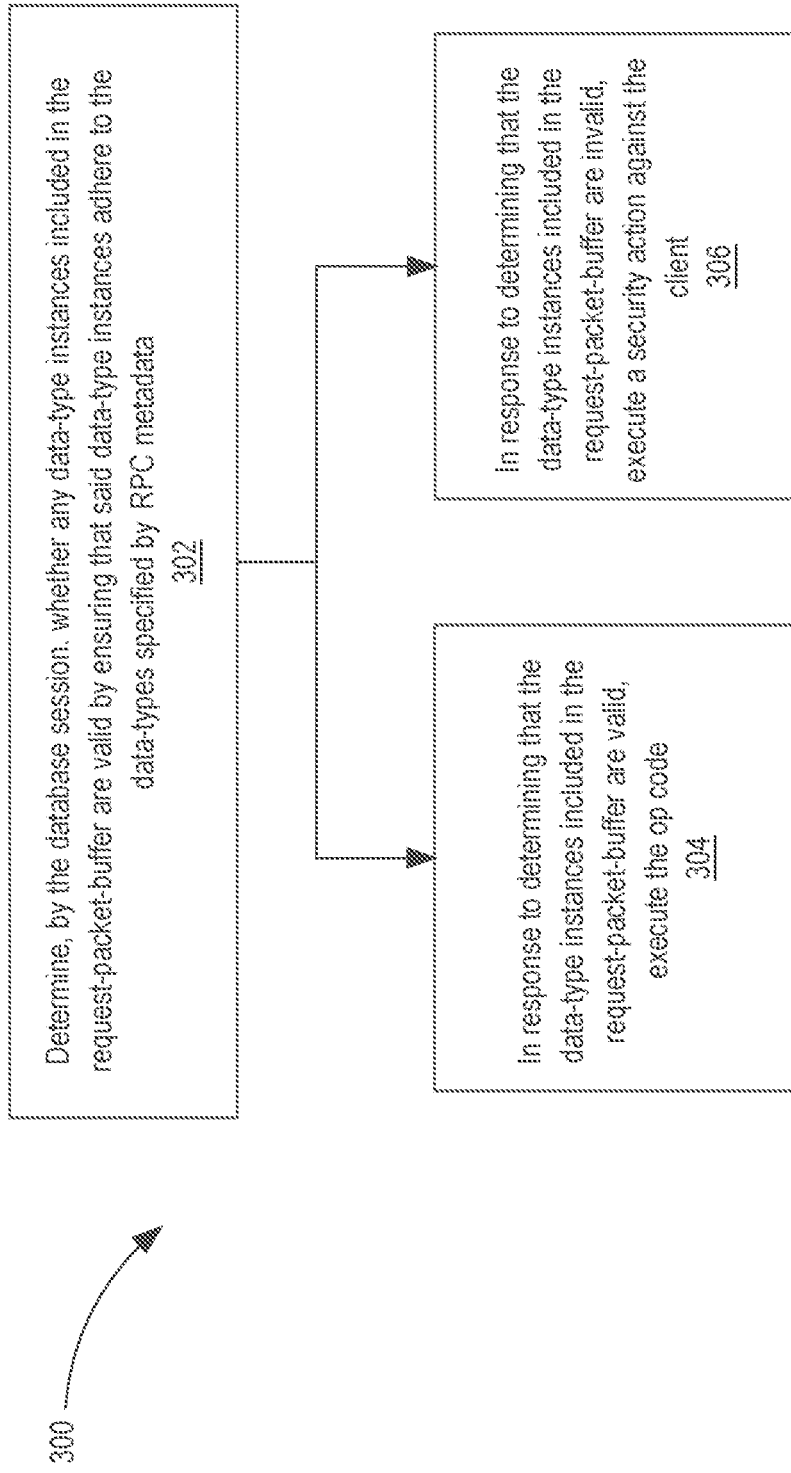
FIG. 3 illustrates a procedure for deep input validation, according to various embodiments.

Referring now to FIG. 3, in step 302, the database session determines whether data-type instances included in the request-packet-buffer are valid by referring to the RPC metadata for the expected type and checking whether the data-type values included in the request-packet-buffer adhere to the specified types. For example, the database session validates if each data type included in the request-packet-buffer 118 strictly adhere to the format expected for a well-formed type-instance of that respective type as specified by RPC metadata from the RPC layer 116. This type of checking is carried out for all input parameters of an incoming RPC.

In an embodiment, the database session determines whether any data type instances included in the one or more request-packet-buffers are valid by ensuring that the data type instances adhere to type information from a data dictionary. For example, object types, e.g. user defined types, may be validated by ensuring that the object types instances in the request-packet-buffer adhere to the format specified by type information from a data-dictionary stored in an associated database, container database or pluggable database. Container databases and pluggable databases are described below.

In an embodiment, the database session further determines whether data-types included in the request-packet-buffer are valid by comparing the bits corresponding to each specific datatype instance from the request-packet-buffer 118 to the specified format for that type including any range constraints on each byte constituting the value from the RPC metadata included in the RPC layer 116.

In an embodiment, the RPC layer iterates through the serialized representation of the RPC included in the request-packet-buffer, re-constructs the RPC parameters in memory, and validates the parameters on the fly. For example, if a certain parameter is an identifier length, then the RPC layer can perform additional checks to ensure that the length of the parameter does not exceed the maximum size of an identifier. Similarly, if a certain RPC parameter is mandatory, then the RPC layer can ensure that the parameter is present before it is processed further. Alternatively, if a certain parameter is a NUMBER, DATE, TIMESTAMP, TIMESTAMP WITH IMPLICIT TIMEZONE, TIMESTAMP WITH TIMEZONE, CLOB or BLOB Locator, Object Type, UROWID, ROWID, the RPC layer ensures that the parameter adheres strictly to the specified formats for each type before performing any further processing. This process ensures that the RPC processing is interrupted as soon as the RPC layer detects malformed data, thereby disallowing potentially malicious input data from being processed any further.

At step 304, in response to determining that the data-type instances included in the request-packet-buffer are valid, the database session executes the operation associated with the RPC op code included in the data packets. For example, in context of FIG. 2, upon determining that the data-type instances included in the request-packet-buffer match the format and constraints required by the type-information from the metadata from the RPC layer 116, the database session will execute the RPC op code.

At step 306, in response to determining that the data-type instances included in the request-packet-buffer are not valid, the database session executes a security action against the client. For example, upon determining that the data-type instances included in the request-packet-buffer do not conform to the format and constraints required by the type-information of the metadata from the RPC layer 116, the database server 106 will execute a security action against the client who sent the invalid network packets.

In an embodiment, in response to determining that the data-types included in the request-packet-buffers are not valid, the database session may prevent the execution of the system operation associated with the op code in addition to executing a security action against the client.

In various embodiments, executing a security action may include the database server suspending, disconnecting, or slowing down the database session with the particular client.

In an embodiment, if the database server detects a threshold number of malformed or invalid request-packet-buffers from a particular client, the database server may suspend, disconnect, or slow down the database session with the particular client. The request-packet-buffers may be considered invalid or malformed if, for example, the RPC op code included in the request-packet-buffer is disallowed or the data-type instances in the request-packet-buffers do not conform to the data-type formats and constraints specified by the data types in the RPC metadata. For example, if the database server detects 3, or any particular threshold number of malformed or invalid request-packet-buffers received from a particular client, the database server may suspend, disconnect, or slow down the database connection or session with the particular client.

In an embodiment, logs that record a history of data packets and/or request-packet-buffers sent and/or received between a particular client and database server may be stored. The logs may include indications of whether a particular packet and/or request-packet-buffer from a particular client was valid or invalid. Any combination of historical data that indicates the validity or invalidity of request-packet-buffers received and checked by the database server may be utilized to determine whether a security action should be executed against a particular client.

It should be noted that in other approaches, the SQL compilation/execution layer may perform checks on data type instances before performing requested SQL operations. The operations described in FIG. 3 are performed by the RPC layer much earlier in the request processing lifecycle, before compiling or executing any specific SQL statement included in the RPC.

In an embodiment, although the invention is discussed above in context of a database server, the invention may also be implemented by an external software component to a database server, such as a firewall.

DBMS Overview

Embodiments of the present invention are used in the context of DBMSs. Therefore, a description of a DBMS is useful.

A DBMS manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

A database block, also referred to as a data block, is a unit of persistent storage. A database block is used by a database server to store database records (e.g., to store rows of a table, to store column values of a column). When records are read from persistent storage, a database block containing the record is copied into a database block buffer in RAM memory of a database server. A database block usually contains multiple rows, and control and formatting information, (e.g., offsets to sequences of bytes representing rows or other data structures, list of transactions affecting a row). A database block may be referenced by a database block address (DBA).

A database block is referred to as being atomic because, at least in part, a database block is the smallest unit of database data a database server may request from a persistent storage device. For example, when a database server seeks a row that is stored in a database block, the database server may only read the row from persistent storage by reading in the entire database block.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computation resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance." A database server may comprise multiple database instances.

Multitenant Architecture

A container is a collection of schemas, objects, and related structures in a multitenant container database (CDB) that appears logically to an application as a separate database. Within a CDB, each container has a unique ID and name. The root database and every pluggable database (PDB) is considered a container. PDBs isolate data and operations so that from the perspective of a user or application, each PDB appears as if it were a traditional non-CDB. Each PDB is defined by its own separate database dictionary. A database dictionary comprises metadata that defines database objects contained in a database. In effect, a database dictionary defines the totality of a database. Database objects include tables, table columns, and tablespaces. A tablespace is a set of one or more files that are used to store the data for various types of database objects, such as tables. If data for a database object is stored in a tablespace, a database dictionary maps a database object to one or more tablespaces that hold the data for that database object.

The root container, also called "the root", is a collection of schemas, schema objects, and nonschema objects to which all PDBs within a particular CDB belong. Every CDB has one root which stores the system metadata required to manage all PDBs within the CDB. In some implementations, the root does not store "user" data but instead stores data that is common across the PDBs of the CDB, such as definitions for common users and roles, shared tables, code packages, and so forth. A PDB comprises a user-created set of schemas, objects, and related structures that appears logically to an application as a separate database. As a result, each PDB can potentially be used to store data related to a different application, such as one PDB being dedicated to hosting a human resources application and another PDB being dedicated to hosting a sales application.

However, since shared resources are stored just once in the root database and linked to by the database dictionaries of the PDBs, duplication of data is avoided compared to hosting each application with a completely separate traditional database. Furthermore, since PDBs are essentially self-contained databases in their own right, PDBs can be easily transferred between different CDBs for upgrade or load balancing purposes.

Additionally, multiple tenants can potentially access the same CDB. As multiple tenants can potentially access the same CDB, multiple pluggable database sessions may be established between multiple tenants and the same CDB.

Container Databases

Various embodiments may be implemented or discussed in context of a container database. Container databases are described, for instance, in U.S. Pat. No. 9,239,763, the entire contents of which are hereby incorporated by reference for all purposes as if fully set forth herein.

A container database may contain multiple databases that are hosted and managed by a database server. The databases may include an application root, one or more pluggable databases, and a root database, which is associated with the application root, and a pluggable database. A root database may be a database that is used by the database server to globally manage the container database, and to store metadata and/or data for "common database objects" that are accessible to users of the pluggable databases within the container database.

The application root may be a database that is used by the database server to store metadata and/or data for database objects which are shared among a subset of the PDBs within the container database which are used by or implement the same application. The application root may store a database dictionary, which stores definitions for data-linked and metadata-linked database objects, common users and roles for the application container, identifiers for the member PDBs of the application container, and so forth. Data for data-linked database objects of the application root may be stored in tablespace files. Metadata contained in the database dictionary may be stored in file such as APPROOT.DIC. In some embodiments, the metadata of the application root that specifies the version number of the application that the application root implements is stored in the database dictionary. Similarly, the application version number of the member PDBs may be stored in the respective database dictionaries of the member PDBs.

The pluggable database may include a database dictionary. Tablespace Files may store data for database objects of pluggable database. Metadata for database dictionary may be stored persistently in a file such as PDB.DBDIC.

The database server responsible for the container database may establish database sessions to the root database, the application root, or any of the member pluggable databases. The database to which the database session connects determines the scope of the commands issued by the database client (e.g. which database(s) the command will be executed on), which permissions are checked, which database dictionaries will be used for the session, and so forth.

The root database may be a database used by the database server to globally manage the container database. An important function facilitated by root database is to define pluggable databases within the container database. Similar to pluggable databases, the root database includes a database dictionary. The database dictionary of a root database may be referred to herein as a root database dictionary. The root database dictionary contains metadata that defines various aspects of the container database needed to administer container database and the pluggable databases contained therein. Data for database objects defined by database dictionary is stored in tablespace files.

The root database dictionary may include a database object, Database_sys, which may be represented as a table. Database_sys defines pluggable databases within the container database and attributes of Database_sys each describe an aspect or property of a pluggable database. Attributes may include a name or label for a pluggable database and an identification of a dictionary store that holds metadata pointing towards the database dictionaries of the member pluggable databases.

The database dictionary of the application root contains a structurally identical table to Database_sys, which identifies the pluggable databases which are members of the application container of the application root and describes the aspects and/or properties of the member PDBs.

In an embodiment, the root database dictionary defines common database objects that are shared or commonly used by the pluggable databases in container database. A common database object is defined in a pluggable database dictionary, which includes a reference to the common database object in the respective root database dictionary. Examples of common database objects include vendor supplied functions, utilities, tables, and views. In an embodiment, database dictionary of the application root defines common database objects that are shared or commonly used by the member PDBs of the application root.

According to an embodiment, with respect to the root database and application root there are two types of common database objects: a metadata-linked object and an object-linked object, which have been described previously.

Software Overview

Figure 4:
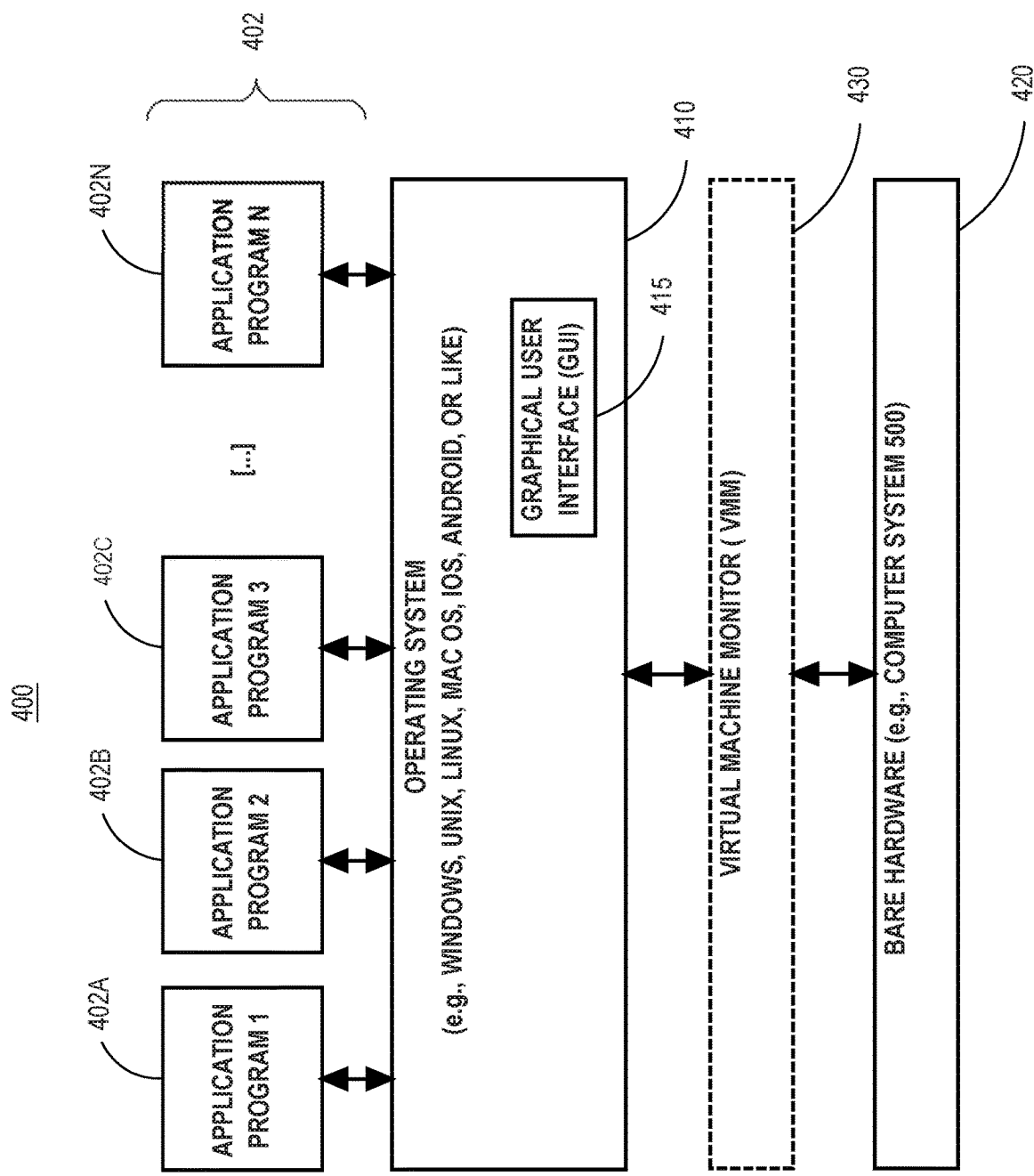
FIG. 4 is a block diagram that illustrates a software system upon which an embodiment of the invention may be implemented.

FIG. 4 is a block diagram of a basic software system 400 that may be employed for controlling the operation of computing system 500 of FIG. 5. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 500. Software system 400, which may be stored in system memory (RAM) 506 and on fixed storage (e.g., hard disk or flash memory) 510, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 510 into memory 506) for execution by the system 400. The applications or other software intended for use on computer system 500 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 504) of computer system 500. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 500.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 500 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
    a database session of a client receiving one or more network packets sent via a network, said database session including a database session state that specifies one or more database privileges for the client;

said database session reading said one or more network packets into one or more request-packet-buffers, wherein said one or more request-packet-buffers include a Remote Procedure Call (RPC) op code for a database operation;

before compiling said database operation, based on said one or more database privileges specified by said database session state, determining whether said RPC op code is permitted to be executed by said database session;

in response to determining that said RPC op code is permitted to be executed by said database session, compiling said database operation, wherein compiling said database operation includes determining whether said database session is permitted to execute said database operation based on said one or more database privileges specified by said database session state.

2. The method of claim 1, wherein the database session comprises a connection between the client and a database server.

3. The method of claim 1, wherein the database session comprises a connection between the client and a pluggable database.

4. The method of claim 1, wherein a database server associated with the database session includes an initialization parameter indicating one or more allowed categories of RPCs that the database session is allowed to execute;

further comprising: based on the one or more allowed categories of RPCs, determining whether said RPC op code is permitted to be executed by the said database session.

5. A method comprising:

a database session receiving one or more network packets sent via a network, said database session including a database session state that specifies one or more database privileges;

said database session reading said one or more network packets into one or more request-packet-buffers, wherein said one or more request-packet-buffers include a Remote Procedure Call (RPC) op code for a database operation;

wherein the RPC op code associated with the one or more request packet-buffers is associated RPC metadata specifying data-types and constraints for each of one or more RPC parameters of the RPC op code;

before compiling said database operation, determining, by a database session, whether any data type instances included in one or more request-packet-buffers are valid;

compiling said database operation, wherein compiling said database operation includes determining whether any of said datatype instances are valid.

6. The method of claim 5, wherein said determining whether any data type instances included in the one or more request-packet-buffers are valid includes ensuring that said data type instances adhere to type information from a data dictionary.

7. The method of claim 5, wherein said determining whether any data type instances included in the one or more request-packet-buffers are valid includes ensuring that said data type instances adhere to the data-types specified by the associated RPC metadata.

8. The method of claim 7, wherein said ensuring that said data type instances adhere to the data-types specified by the associated RPC metadata includes comparing bits corresponding to each specific data type instance included in the one or more request-packet-buffers to an expected format for each specific datatype specified by the associated RPC metadata.

9. The method of claim 7, further comprising: in response to determining that the data-type instances included in the one or more request-packet-buffers are invalid, preventing an execution of said RPC op code.

10. The method of claim 7, further comprising: in response to determining that the data-type instances included in the one or more request-packet-buffers are invalid, executing a security action.

11. The method of claim 7, further comprising: in response to receiving a threshold number of invalid new packets from a particular client through said database session, executing a security action.

12. The method of claim 11, wherein the security action comprises: auditing, slowing down, or evicting a client associated with said database session.

13. One or more non-transitory media storing instructions which, when executed by one or more computing devices, cause:

a database session of a client receiving one or more network packets sent via a network, said database session including a database session state that specifies one or more database privileges for the client;

said database session reading said one or more network packets into one or more request-packet-buffers, wherein said one or more request-packet-buffers include a Remote Procedure Call (RPC) op code for a database operation;

before compiling said database operation, based on said one or more database privileges specified by said database session state, determining whether said RPC op code is permitted to be executed by said database session;

in response to determining that said RPC op code is permitted to be executed by said database session, compiling said database operation, wherein compiling said database operation includes determining whether said database session is permitted to execute said database operation based on said one or more database privileges specified by said database session state.

14. The one or more non-transitory storage media of claim 13, wherein the database session comprises a connection between the client and a database server.

15. The one or more non-transitory storage media of claim 13, wherein the database session comprises a connection between the client and a pluggable database.

16. The one or more non-transitory storage media of claim 13, wherein a database server associated with the database session includes an initialization parameter indicating one or more allowed categories of RPCs that the database session is allowed to execute;

further comprising: based on the one or more allowed categories of RPCs, determining whether said RPC op code is permitted to be executed by the said database session.

17. One or more non-transitory media storing instructions which, when executed by one or more computing devices, cause:

a database session receiving one or more network packets sent via a network, said database session including a database session state that specifies one or more database privileges;

said database session reading said one or more network packets into one or more request-packet-buffers, wherein said one or more request-packet-buffers include a Remote Procedure Call (RPC) op code for a database operation;

wherein the RPC op code associated with the one or more request packet-buffers is associated RPC metadata specifying data-types and constraints for each of one or more RPC parameters of the RPC op code;

before compiling said database operation, determining based on the associated RPC metadata, by a database session, whether any data type instances included in the one or more request-packet-buffers are valid;

compiling said database operation, wherein compiling said database operation includes determining whether any of said datatype instances are valid.

18. The one or more non-transitory storage media of claim 17, wherein said determining whether any data type instances included in the one or more request-packet-buffers are valid includes ensuring that said data type instances adhere to type information from a data dictionary.

19. The one or more non-transitory storage media of claim 17, wherein said determining whether any data type instances included in the one or more request-packet-buffers are valid includes ensuring that said data type instances adhere to the data-types specified by the associated RPC metadata.

20. The one or more non-transitory storage media of claim 19, wherein said ensuring that said data type instances adhere to the data-types specified by the associated RPC metadata includes comparing bits corresponding to each specific data type instance included in the one or more request-packet-buffers to an expected format for each specific datatype specified by the associated RPC metadata.

21. The one or more non-transitory storage media of claim 19, further comprising instructions, which when executed by the one or more processors, cause: in response to determining that the data-type instances included in the one or more request-packet-buffers are invalid, preventing an execution of said RPC op code.

22. The one or more non-transitory storage media of claim 19, further comprising instructions, which when executed by the one or more processors, cause: in response to determining that the data-type instances included in the one or more request-packet-buffers are invalid, executing a security action.

23. The one or more non-transitory storage media of claim 18, further comprising instructions, which when executed by the one or more processors, cause: in response to receiving a threshold number of invalid network packets from a particular client through said database session, executing a security action.

24. The one or more non-transitory storage media of claim 23, wherein the security action comprises: auditing, slowing down, or evicting a client associated with said database session.

* * * * *

UNITED STATES PATENT AND TRADEMARK OFFICE
CERTIFICATE OF CORRECTION

PATENT NO. : 11,277,435 B2
APPLICATION NO. : 15/705113
DATED : March 15, 2022
INVENTOR(S) : Itikarlapalli et al.

It is certified that error appears in the above-identified patent and that said Letters Patent is hereby corrected as shown below:

In the Claims

In Column 17, Line 47, in Claim 5, delete "determining," and insert -- determining based on the associated RPC metadata, --, therefor.

In Column 17, Line 49, in Claim 5, delete "in" and insert -- in the --, therefor.

In Column 17, Line 53, in Claim 5, delete "datatype" and insert -- data type --, therefor.

In Column 18, Line 14, in Claim 11, delete "new" and insert -- network --, therefor.

In Column 19, Line 14, in Claim 17, delete "datatype" and insert -- data type --, therefor.

In Column 20, Line 19, in Claim 23, delete "18," and insert -- 19, --, therefor.

Signed and Sealed this
Thirtieth Day of August, 2022

Katherine Kelly Vidal
*Director of the United States Patent and Trademark Office*